8868X
2 Sheets-Sheet 1
H. Aiken,
Shaving Leather.
Patented June 12, 1835.
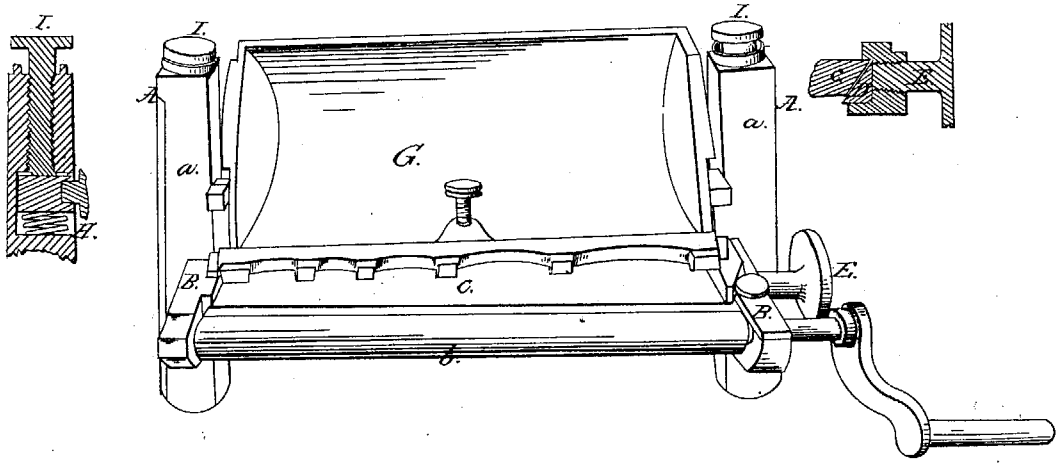
N. PETERS, PHOTO-LITHOGRAPHER, WASHINGTON, D. C.

8868X June 12. 1835

Herrick Aiken of Middlesex Co Massachusetts

Letters Patent

The Schedule referred to in these Letters Patent and making part of
the same containing a description in the words of the said Her
rick Aiken himself of his improvement new machine for
splitting and paring leather called "Aiken's machine for split
ting, skiving or skarfing leather"

Be it known that I Herrick Aiken of Dracut, County of
Middlesex, State of Massachusetts have made an improvement
in the useful arts being a machine for splitting and pairing
leather called Aiken's machine for splitting or skiving or skarf
ing leather. which is described as follows: This machine con
sists of the following principle parts. The frame, the knife,
the spring seat the scolloping regulator, the regulating screws,
and the screw for confining the blade. The frame is made of
cast iron consisting of two pillars or ends connected by a cross piece
the ends to be about 8 inches long. and the cross piece about 10
inches. There is a projection on each end, containing two pins
for letting into a bench, for confining it to its place when in
use. Also on the opposite side are two other projections having
grooves in them for receiving the ends of the knife. One groove
is made bevelling, and the other is made square, with a follower
to bear against the end of the knife. The last described projec
tion contains a screw to operate against the follower to confine
the knife. The knife is a straight blade with the ends bev
elling. and is confined in the grooves in the frame by the means
of the screw before mentioned. The spring seat is placed in the
frame before the blade for pressing the leather against the regula
tor. The seat is supported by a spiral spring in each pillar.
The scolloping regulator is an iron lined hollow semicircle sus
pended on axles in boxes supported in the frame by spiral springs
It is moved up and down by two regulating screws one in the 326. 8868X end of each pillar, which operates on the boxes. There are stops on the regulator to keep it to its place. Operation. The leather to be split or shaved; being cut to its proper length and width and the regulator adjusted to the thickness required is turned partly round which opens a space to admit the leather it is then turned back upon the leather; and the leather drawn through by hand and thus reduced to its required thickness. This regulator also answers the purpose of bevelling the ends of the straps. The Invention here claimed and desired to be secured by Letters Patent consists in the arrangement and adaptation of the several parts of the machine so as to produce the one before described, but I particularly claim the method of confining the Knife, and the construction of the Regulator.

Witnesses
[illegible] Clement T Coote
[illegible] G Alfred Elliot

Herrick Aiken (Drawing)

(4884 model)

(Patented June 12. 1835)